United States Patent [19]

Ramus

[11] Patent Number: 4,543,466

[45] Date of Patent: Sep. 24, 1985

[54] BUS BAR ARRANGEMENT FOR UNIFORMLY HEATING A TRAPEZOIDALLY-SHAPED ELECTRICALLY HEATED WINDSHIELD

[75] Inventor: Kevin J. Ramus, Dearborn, Mich.

[73] Assignee: Ford Motor Company, Dearborn, Mich.

[21] Appl. No.: 627,266

[22] Filed: Jul. 2, 1984

[51] Int. Cl.$^4$ ............ H05B 3/26; E06B 7/12; B60J 1/20

[52] U.S. Cl. .................... 219/203; 219/345; 219/522; 219/541; 219/543; 219/547; 338/309

[58] Field of Search ............ 219/203, 522, 547, 543, 219/345, 213, 541; 338/308, 309; 52/170, 171

[56] References Cited

U.S. PATENT DOCUMENTS

| | | | |
|---|---|---|---|
| 2,569,773 | 10/1951 | Orr | 219/543 |
| 2,689,803 | 9/1954 | Ackerman | 338/308 X |
| 2,710,900 | 6/1955 | Linder | 219/543 |
| 2,724,658 | 11/1955 | Lytle | 219/543 X |
| 2,725,319 | 11/1955 | Tarnopol | 338/308 |
| 2,843,713 | 7/1958 | Morgan | 219/543 |
| 3,302,002 | 1/1967 | Warren | 219/543 |
| 3,313,920 | 4/1967 | Gallez | 219/203 X |
| 3,317,710 | 5/1967 | Boicey | 219/543 |

Primary Examiner—A. Bartis
Attorney, Agent, or Firm—William E. Johnson; Clifford L. Sadler

[57] ABSTRACT

An electrically heated windshield of generally trapezoidal shape has been bus bars of uniform conductivity throughout their length extending in line contact with the upper and lower edges of a continuous uniformly thick trapezoidal-shaped electrically conductive coating provided on the windshield surface for deicing and defrosting the windshield. The line of contact of the upper bus bar with the conductive coating has a length generally equal to the entire effective length of the upper edge of the conductive coating. The lower bus bar is symetrically located along the lower edge of the conductive coating and has a line of contact length equal to the sum of the length of the upper bus bar plus generally about one-half the difference between the entire effective length of the lower edge of the conductive coating minus the length of the line of contact of the upper bus bar.

2 Claims, 3 Drawing Figures

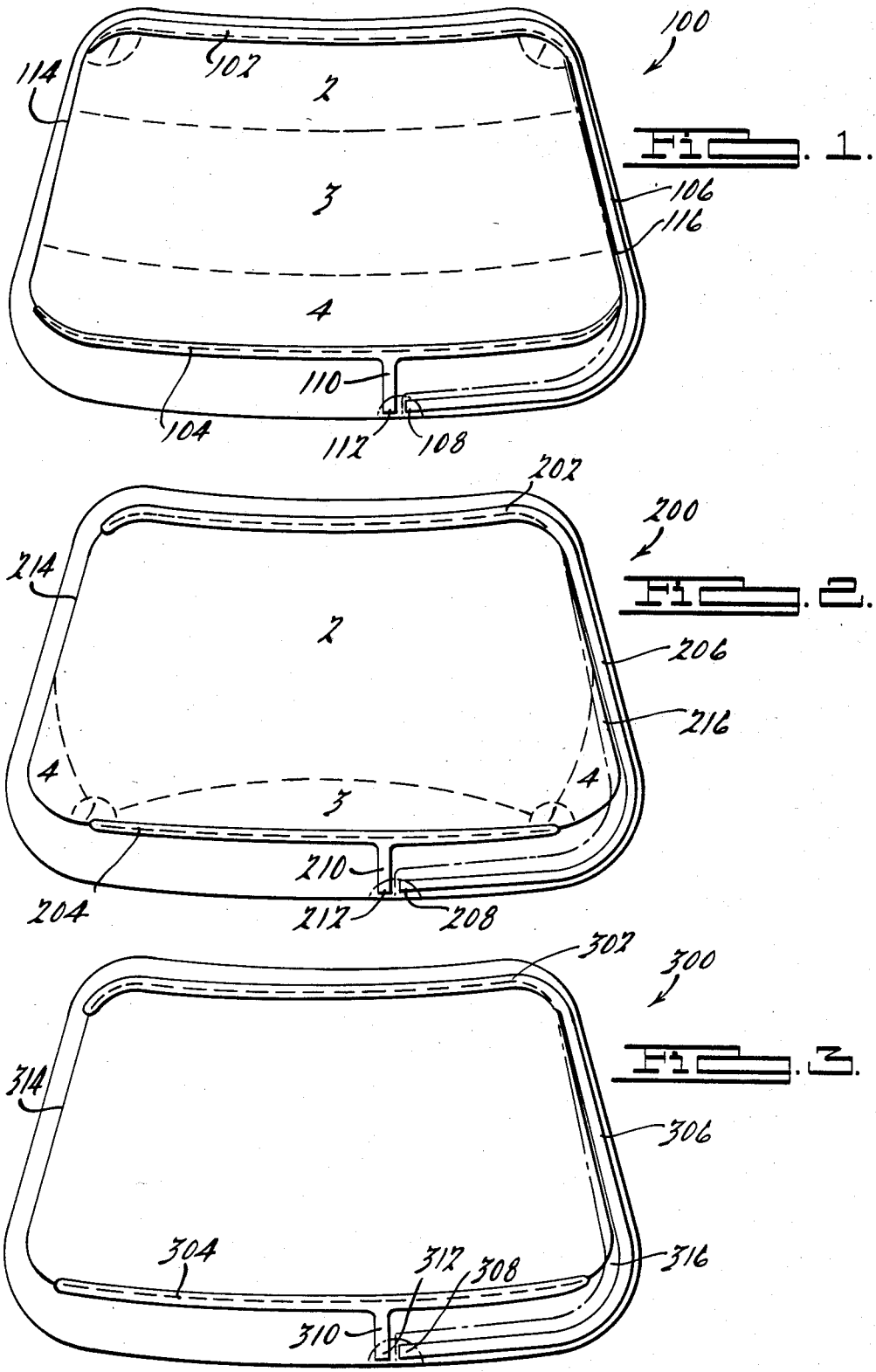

BUS BAR ARRANGEMENT FOR UNIFORMLY HEATING A TRAPEZOIDALLY-SHAPED ELECTRICALLY HEATED WINDSHIELD

TECHNICAL FIELD

This application is directed to an electrically heated windshield construction which finds principal use as the windshield vision unit of a vehicle such as a motor vehicle. This vision unit is one which may be defogged and deiced by application of an electric current to an electrically conductive coating on or in the windshield. Generally the electrically conductive coating, which covers most of a windshield surface, is transparent to radiation in the visible wavelength range.

BACKGROUND AND PRIOR ART STATEMENT

Motor vehicles, as presently manufactured, are equipped with systems for defogging and deicing windshields. Generally these systems depend upon heat generated in the internal combustion engine and transferred to the engine's cooling system to be blown as warm air across the interior of the windshield to accomplish the defogging and deicing. In such a case, of course, it is readily apparent that there is a period of time between the starting of an engine and the time that sufficient heat is being generated in its cooling system in order to provide a defogging and deicing of the vehicle's windshield. Depending upon the exact temperature conditions and the time the vehicle has been sitting idle without its engine running, the period of time before sufficient heat is available to accomplish this function can be up to 10 minutes or more.

In view of the fact that there can be a rather lengthy delay before the present day motor vehicle's heating and defrosting system can clear a windshield, automotive designers have been attempting to design systems which generate heat from electrical energy to accomplish a relatively rapid defrost and deicing of a vehicle windshield. Such an electrically heated defrosting and deicing system generally would be independent of the normal heating and defrosting system contained in a motor vehicle.

Many different systems have been proposed for accomplishing this rapid defrost and deicing function, including the placement of an electrically conductive transparent coating on the windshield and embedding fine wires in a laminating interlayer of the windshield. To the best of my knowledge there are no such rapid defrost and deicing systems in vehicles which are currently sold in the U.S. market. I believe this is because of the relatively high cost of such systems and also because of the electrical problems associated with the installment of such a system on a vehicle windshield such as found in today's automobiles. The windshield found in today's automobiles is generally of trapezoid shape. By this I mean the modern day windshield is smaller in length dimension at the top thereof than at the bottom thereof. The top dimension of the windshield is reduced because the aerodynamic styling of motor vehicles dictates such a configuration for the windshield to fit on the rounded body shapes now being manufactured.

I personally conducted a search in the U.S. Patent and Trademark Office to determine if the electrically heated windshield construction of my invention was novel. During this search, I uncovered many patents dealing with heated window constructions. However, of the many patents that I did look at, I believed that none really were relevant to the electrically heated windshield construction of my invention. However, I would like to point out the teachings of four U.S. patents that were of some interest to me simply for their showing of a development of electrically heated window structures.

U.S. Pat. No. 957,728 issued on May 10, 1910 for a "Window." This patent shows a window for vehicles which includes a pane of glass, conducting wires embedded in the glass, and a device for automatically throwing the wires in circuit upon closing of the window and opening the circuit upon opening of the window.

U.S. Pat. No. 3,313,920 issued on Apr. 11, 1967 for a "Heater Panel." The heater panel shown comprises at least one electrically insulated glass sheet with an electrically conductive transparent film formed thereon. A single pair of electrodes extended parallel to each other in contact with the conductive transparent film. The film had a plurality of grooves extending between the electrodes for isolating the film on either side of the grooves to define a plurality of isolated strips of conductive film extending from one electrode to the other and in electrical contact with such electrodes.

U.S. Pat. No. 3,947,618 issued on Mar. 30, 1976 for an "Electrically Heated Transparent Panel." The electrically heated transparent panel described in this patent is a laminated safety glass windshield construction. This construction has a clear polymer interlayer with a pattern of wrinkled resistance wires oriented in a three dimensional nonparallel random fashion so as to reduce glare from wires when the window is used in an automotive or other type of vehicle. It is quite obvious that this construction did not find wide acceptance as I am unaware of any commercial development of this style of electrically heated window.

U.S. Pat. No. 4,361,751 issued on Nov. 30, 1982 for "Electroconductive Window Having Improved Bus Bar." This patent discloses an electroconductive laminated window having an electroconductive coating applied to one interior substrate surface with a pair of bus bars electrically connecting a source of electrical potential thereto. The bus bars include an electroconductive layer having volume resistivity less than about $10^{-2}$ ohm/cm interposed between and conformable to the surface configurations of the electroconductive coating and a flexible metallic current carrying member. The metallic current carrying member is preferably a mesh of thin copper foil which is substantially bendable in its own plane. The electroconductive layer is preferably a metallic layer substantially free of nonmetallilc components consisting of a mixture of finely divided electroconductive particles and finely divided metal alloy particles having a fusion temperature between about 70° C. and about 150° C.

The structures discussed above are substantially different than the electrically heated windshield which includes the improved bus bar configuration of my invention. The improved bus bar configuration of my invention finds particular use in an electrically heated windshield construction which is used as the forward vision unit of a motor vehicle such as an automobile or a truck.

SUMMARY OF THE INVENTION

This invention is directed to an electrically heated windshield construction and more particularly to an electrically heated windshield construction in which the windshield (a) is of generally trapezoidal shape, (b) has both an upper, generally horizontally extending bus bar and a lower, generally horizontally extending bus bar, and (c) a trapezoidal shaped electrically conductive coating on the windshield which electrically interconnects the upper bus bar and the lower bus bar.

In accordance with broad principles and teachings of the windshield construction of this invention, an improved bus bar configuration for that construction is one in which the bus bars are so constructed and arranged that the lower, generally horizontal bus bar is longer in bus bar line of contact with the trapezoidal shaped electrically conductive coating on the windshield than the upper, generally horizontally extending bus bar. In accordance with the construction of my invention, the relative lengths of the bus bar's line of contact with the electrically conductive coating on the windshield is such that the windshield will defrost and deice in an efficient and uniform manner between bus bars.

In accordance with detailed teachings of an electrically heated windshield construction in accordance with my invention, the improved bus bar configuration is one which is formed in the following manner. The bus bars are formed in a manner such that two basic conditions exist. A first condition that exists in the bus bar configuration is that a line of contact of the upper, generally horizontally extending bus bar with the electrically conductive coating has a length which extends generally along an entire effective length of an upper edge of the electrically conductive coating on the windshield. By "effective length" of an edge of the electrically conductive coating on the windshield I mean the extent of the edge of the conductive coating which primarily traverses a particular direction (for example, the upper edge of the electrically conductive coating) before that edge turns in a different direction to define, for example, a side edge of the conductive coating.

The second basic condition that exists for the bus bar configuration is as follows. A line of contact of the lower, generally horizontally extending bus bar with the electrically conductive coating has a length which is equal to the sum of factor (a) and factor (b) following. Factor (a) is the length of the line of contact of the upper bus bar. Factor (b) is equal to about one-half of the difference between the length of a line of contact for the lower bus bar if it extended generally along an entire effective length of a lower edge of the electrically conductive coating on the windshield minus the length of the line of contact of the upper bus bar. When the lines of contact of the upper, generally horizontally extending bus bar and the lower, generally horizontally extending bus bar are controlled to such dimensional lengths, the windshield will defrost and deice in an efficient and uniform manner between the two bus bars. In this way, the period of time of defrosting and deicing is reduced substantially from that which would be obtained from using only the existing defroster mechanism associated with the vehicle.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 1 is a schematic diagram of a first design I developed for a bus bar configuration for an electrically heated windshield which did not give a desirable defrost and deicing pattern;

FIG. 2 is a schematic diagram of a second design I developed for a bus bar configuration for an electrically heated windshield which also did not produce an acceptable defrost and deicing pattern; and FIG. 3 is a schematic diagram of the improved bus bar configuration of my invention for an electrically heated windshield construction which did give a very desirable defrosting and deicing pattern for the windshield construction.

BEST MODE AND INDUSTRIAL APPLICABILITY

The following description is what I consider to be a discussion of some of my earlier work and then of the electrically heated windshield construction which embodies my inventive construction. The following description also sets forth what I now contemplate to be the best mode of making my construction. However, this description is not intended to be a limitation upon the broader principles of this construction, and while preferred materials are used to form the construction in accordance with the requirements of the laws, it does not mean that other materials cannot be used to make this construction.

For example, the electrically heated windshield described below is one which is a laminated type of windshield. That is, there are two sheets of glass used to form the windshield, the two sheets of glass being united by an interlayer of polyvinylbutyrl in a manner well known to those skilled in the art. Therefore, there will be no further discussion of the lamination of a windshield in this specification.

The electrically conductive coating and bus bars for the electrically heated windshield construction of this invention, in its preferred embodiment, are applied to a surface of one of the sheets of glass used to form the laminated windshield. That is, the conductive coating and the bus bars are on an interior surface of the one sheet of glass of the laminated windshield (preferably closest to the exterior) and thus are protected from being abrated or otherwise contacted with physical articles which might scratch or destroy the same. The construction, however, may be applied to a single sheet of glass (for example, a single sheet of tempered glass) if that is the construction desired.

The electrically conductive coating applied to the windshield is one that may be applied, for example, by a magnetron sputtering operation. Magnetron sputtering of glass surfaces is well known in the art. In accordance with the teachings of a preferred embodiment of this invention, the materials used as target materials in the magnetron sputtering device are zinc and silver, and the resulting coating applied to the windshield is a multilayer coating consisting of zinc oxide and a mixture of silver and zinc oxide which form a coating which is electrically conductive. By electrically conductive I mean that electric current, either AC or DC, can be passed across the silver containing coating.

The bus bars are generally made from a silver ceramic material as known in the art. The bus bars formed of this material are applied to the surface of the windshield to which the conductive coating has been or is to be applied by a silk screen printing operation. Normally, the bus bars are printed and the printing material used is liquid. The liquid material is then dried in a suitable dryer so that the final bus bars are bonded to the surface of the glass.

The order of application of bus bars and conductive coating are not particularly important to this invention. I prefer that the bus bars first be applied to the glass surface and that the conductive coating be applied, in part, over the bus bars and then over the remainder of the windshield surface to which that coating material is to be applied. However, constructions envisioned by me as part of this invention also entail those in which the conductive coating is first applied to the windshield surface followed by the application of bus bars.

While particular operations have been discussed for application of the conductive coating and bus bars, skilled artisans are aware of alternate procedures for applying the conductive coating and bus bars, and these alternate procedures may be used in making the electrically heated windshield construction of my invention.

A significant factor to keep in mind that during the further description contained in this specification is my previous definition of the term "effective length" of an edge of the electrically conductive coating placed on the windshield. That definition was contained in the Summary of Invention section of this specification. In the remainder of this specification, I will describe the development of the electrically heated windshield construction of my invention and how I arrived at that construction.

FIGS. 1 and 2 show early embodiments of my attempts at achieving a desirable electrically heated windshield construction. These early attempts, however, did not prove to have the most efficient and uniform defrosting and deicing characteristics as exhibited by the construction shown in FIG. 3 which is the electrically heated windshield construction of my invention having the improved bus bar configuration developed as a result of my work in this area.

In FIG. 1, there is seen a windshield construction generally designated by the numeral 100. This construction has an upper, generally horizontally extending bus bar 102 and a lower, generally horizontally extending bus bar 104. The upper bus bar 102 has a conductive path 106 terminating in a terminal area 108 to which electrical connection may be made. Similarly, lower bus bar 104 has a conductive path 110 terminating in terminal area 112 to which electrical connection can also be made. In the case of a motor vehicle, connections can be made to an alternator contained in the vehicle.

The windshield construction 100 shown in FIG. 1 as well as the other figures is generally of trapezoidal shape. The trapezoidal shape is dictated by the aerodynamic styling of today's motor vehicles as discussed previously in the Background section of this specification. Since the windshield is of generally trapezoidal shape, the windshield also has a generally trapezoidal shaped electrically conductive coating 114 thereon. In the drawings, the conductive coating is illustrated as if it were visible. In general, however, the coating is transparent and not visible except under certain lighting conditions. However, the bus bars 102 and 104 are clearly visible and the coating 114 normally extends between the two bus bars.

As shown in FIG. 1, the bus bars 102 and 104 were so constructed that each bus bar had a length which extended generally along an entire effective length of the upper edge of the electrically conductive coating 114 for the upper bus bar 102 and along the entire effective length of the lower edge of the electrically conductive coating for the lower bus bar 104. In such a construction, the bus bar 104 is significantly longer than the bus bar 102 because of the trapezoidal shape of the windshield and the electrically conductive coating 114 thereon.

When power is applied between the terminal area 108 and 112 for the respective bus bars 102 and 104, the defogging and deicing of the windshield construction 100 take place as shown in the drawing. It should be noted that an isolation area 116 exists between the conductive coating 114 and the conductive path 106 for the upper bus bar 102 so that no short circuit exists between the upper bus bar 102 and the lower bus bar 104. In the configuration shown in FIG. 1, the first areas to defog or deice on the windshield construction 100 are those areas identified by the numeral 1 at the upper left and right edge of contact between the upper bus bar 102 and the conductive coating 114. These two areas are hot spots with significant amounts of electrical energy and therefore heat concentrated at these areas. The windshield then defogs and deices through zones 2, 3 and 4 in a gradual manner. Such a defogging and deicing is not an efficient and uniform in defrosting or deicing between the bus bars 102 and 104.

In FIG. 2 there is shown a windshield construction generally identified by the numeral 200. In this case an upper, generally horizontally extending bus bar 202 and a lower, generally horizontally extending bus bar 204 are provided to interconnect an electrically conductive coating 214. Other parts of the windshield construction are similar to those shown in FIG. 1, but are identified in the 200 number sequence.

In the case of the windshield construction 200, the upper bus bar 202 has an effective length which extends generally along an entire effective length of the upper edge of the electrically conductive coating 214. However, the length of the lower bus bar 204 is one which has an effective length equal to the effective length of the upper bus bar 202. By this I mean that the effective length of the lower bus bar 204 contacting the lower edge of the electrically conductive coating 214 on the windshield is the same length as the length of contact of the upper bus bar 202 with the upper edge of the conductive coating material.

In the case illustrated in FIG. 2, when power is applied between the two bus bars, the hot spots occur in the zones indicated by the numbers 1 on the lower left and right side of the lower bus bar 204. Thereafter the upper portion of the windshield construction 200 defrosts, followed by the lower part and then the wings or side edges thereof. Once again, this is not an efficient and uniform manner of defrosting and deicing the windshield between the bus bars. In this case the lower bus bar is centered along the length of the lower edge of the conductive coating 214.

In FIG. 3 there is seen an electrically heated windshield construction, generally identified by the numeral 300, in accordance with the teachings of the construction of my invention. Once again, this windshield construction is one in which the windshield is of generally trapezoidal shape as is dictated by the requirements of the shapes of modern motor vehicles. This windshield has an upper, generally horizontally extending bus bar 302 interconnected by a conductive path 306 to a terminal area 308. In a similar fashion, the windshield construction has a lower, generally horizontally extending bus bar 304 connected by a conductive path 310 to a terminal area 312. A trapezoidally shaped electrically conductive coating 314 electrically interconnects the upper bus bar 302 and the lower bus bar 304. Once again, the conductive path 306 is separated by an isolation area 316 from the right edge of the conductive coating 314 as viewed in the FIG. 3 so that no electrical shorting takes place between the bus bars.

In the windshield construction 300, the bus bars are so constructed and arranged that the lower, generally horizontally extending bus bar 304 is longer in bus bar line of contact with the trapezoidal shaped electrically conductive coating 314 on the windshield than the upper, generally horizontally extending bus bar 102. The relative lengths of the bus bar lines of contact with the electrically conductive coating on the windshield are such that the windshield will defrost and deice in an efficient and uniform manner between these two bus bars.

In accordance with a preferred construction, a line of contact of the upper, generally horizontally extending bus bar 302 with the electrically conductive coating 314 has a length which extends generally along an entire effective length of an upper edge of the electrically conductive coating on the windshield as is easily seen in FIG. 3. The line of contact of the lower, generally horizontally extending bus bar 304 with the electrically conductive coating 314 has a length which is equal to the sum of factor (a) and factor (b). Factor (a) is the length of the line of contact of the upper bus bar. Factor (b) is equal to about one-half of the difference between the length of a line of contact for the lower bus bar if it extended along an entire effective length of a lower edge of the electrically conductive coating on the windshield minus the length of the line of contact of the upper bus bar. In general, this may be easily envisioned as a construction which would split the difference of the lower bus bar between the constructions of that bus bar as shown in FIGS. 1 and 2. The lower bus bur, as shown in FIG. 1, extends along the entire effective length of the lower edge of the conductive coating. The lower bus bar, as shown in FIG. 2, extends only along the length of the lower edge of the conductive coating for a length equal to that of the length of the upper bus bar.

I have found that when the bus bar construction is as shown in FIG. 3, the defogging and deicing of the windshield takes place in an efficient and uniform manner between the bus bars. I have found that there is no localized hot spots such as shown in FIGS. 1 and 2, but rather a uniform and smooth transition of the defrosting and deicing takes place from the upper bus bar 302 to the lower bus bar 304. The length of the bus bar 304 should be within plus or minus 15% of this desired balance design in order to achieve the benefits of my windshield construction in which a fast and efficient defogging and deicing of the windshield takes place without any localized hot spots.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. In an electrically heated windshield construction in which said windshield (a) is of generally trapezoidal shape, (b) has both an upper generally horizontally extending bus bar of uniform conductivity throughout its length and a lower generally horizonally extending bus bar of uniform conductivity throughout its length, and (c) a continuous and uniformly thick trapezoidal-shaped electrically conductive coating on said windshield which electrically interconnects said upper bus bar and said lower bus bar; an improved bus bar configuration in which:

said bus bars are formed in a manner such that (1) the line of contact of said upper generally horizonally extending bus bar with said electrically conductive coating has a length which extends generally along an entire effective length of an upper edge of said electrically conductive coating on said windshield, and (2) the line of contact of said lower generally horizontally extending bus bar being symetrically located on the lower edge of said electrically conductive coating and having a length equal to the sum of said length of said line of contact of said upper bus bar plus generally about one-half of the difference between the entire effective length of the lower edge of said electrically conductive coating on said windshield minus said length of said line of contact of said upper bus bar.

2. The electrically heated windshield construction of claim 1, wherein said line of contact of said lower generally horizontally extending bus bar with the lower edge of said electrically conductive coating has a length plus or minus fifteen percent (15%) of a length equal to the sum of said length of said line of contact of said upper bus bar plus generally about one-half of the difference between the entire effective length of the lower edge of said electrically conductive coating on said windshield minus said length of said line of contact of said upper bus bar.

* * * * *